W. G. PALMER.
FRUIT AND VEGETABLE GRADER.
APPLICATION FILED OCT. 20, 1916.
1,228,044.
Patented May 29, 1917.
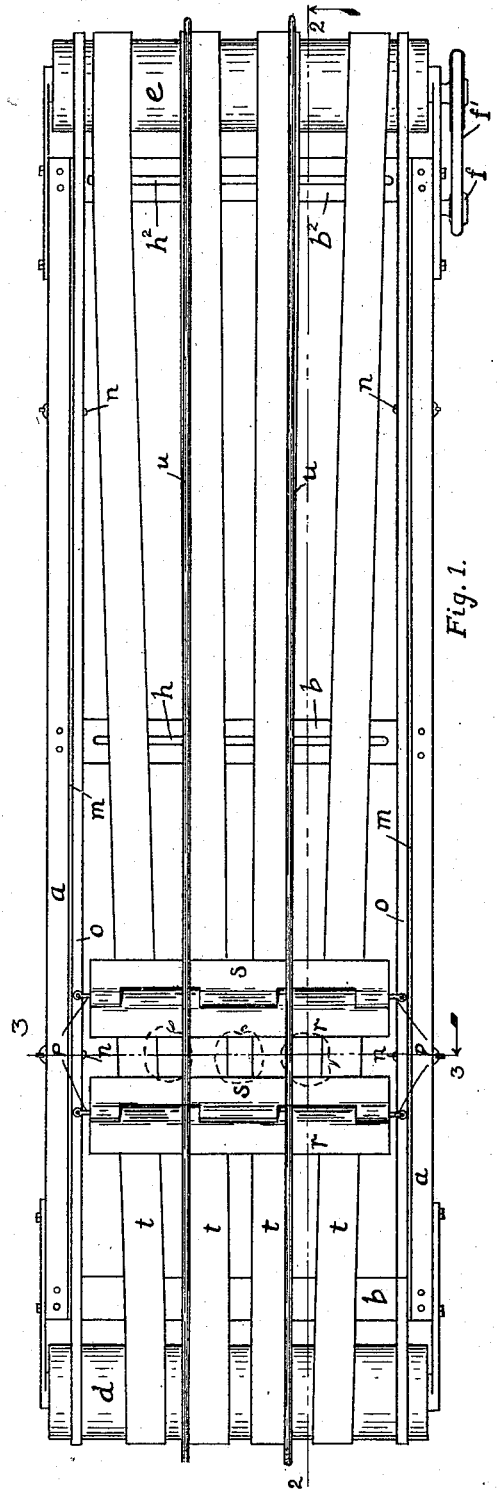
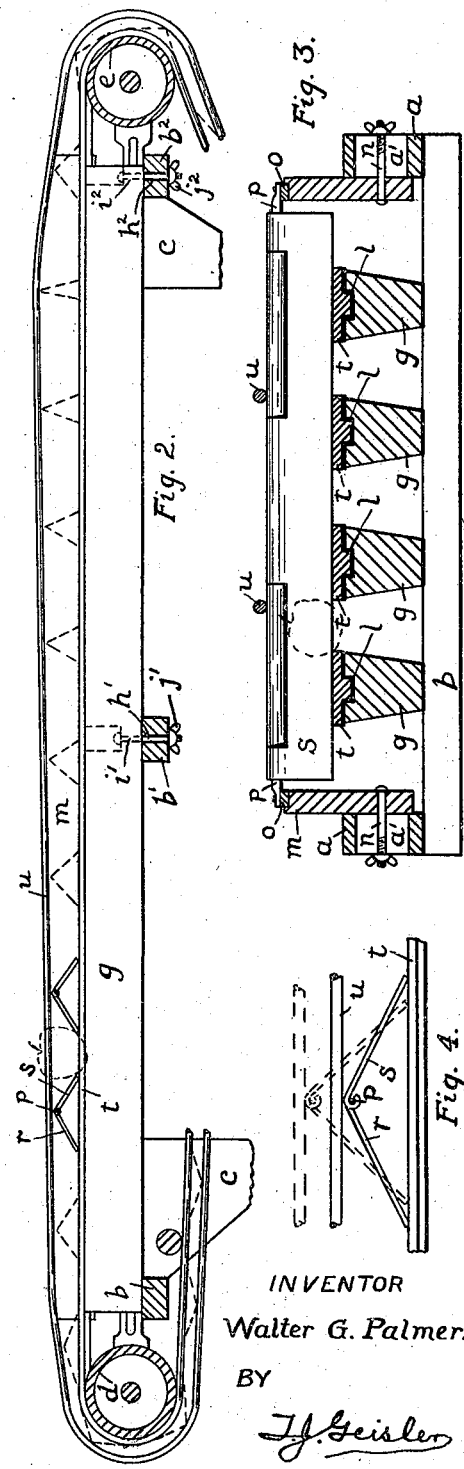
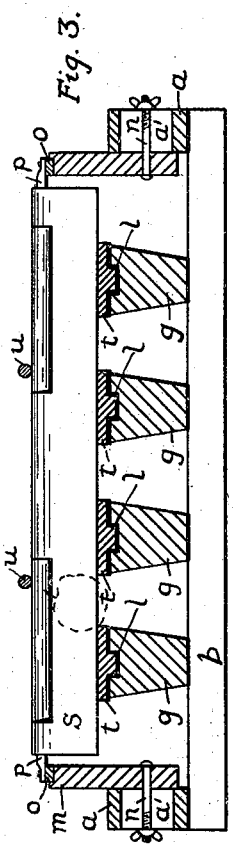
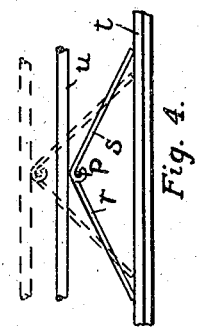
INVENTOR
Walter G. Palmer.
BY
J. J. Geisler
ATTORNEY

UNITED STATES PATENT OFFICE.

WALTER GRANT PALMER, OF WALLACE, IDAHO.

FRUIT AND VEGETABLE GRADER.

1,228,044.  Specification of Letters Patent.  Patented May 29, 1917.

Application filed October 20, 1916. Serial No. 126,808.

*To all whom it may concern:*

Be it known that I, WALTER G. PALMER, a citizen of the United States, and a resident of Wallace, county of Shoshone, State of Idaho, have invented a new and useful Improvement in Fruit and Vegetable Graders, of which the following is a specification.

My invention relates to fruit and vegetable graders of that class which comprise longitudinally traveling conveyances diverging in the direction of travel. The fruit or vegetable to be graded is deposited on the carriers at their convergent ends and as it is carried along the machine will drop into a suitable receptacle, arranged under the machine, whenever the separation due to the divergence of the carriers is greater than the diameter of the piece graded.

Devices of this kind are not entirely satisfactory, however, due to the fact that some fruit, apples and oranges for example, are of oval form, having two unequal diameters. The width of an apple from cheek to cheek, for instance, is generally greater than the diameter from stem to flower; and consequently an apple if lying in one position on the conveyance of the grader will pass through a much smaller space between the conveyance than if lying in another position, and as a result the desired uniformity in the grading of the fruit is not attained.

I have discovered that the proper way to grade this fruit is to move the same over the assorting chutes on a conveyer provided with square holes, through which the fruit drops in its travel along the grader.

I attain this object of my invention by combining with longitudinally extending conveyers, which are the primary grading members of my device, auxiliary grading members arranged transversely to said primary grading members.

I furthermore provide means for causing said transverse, auxiliary grading members to be moved farther apart in unison with the increasing divergence of said primary grading members. In short, I provide an approximately square opening, the sides of which are continually increasing, and whenever the piece to be graded is placed over this opening, being supported by the sides thereof, it will be held therein until the sides have been spread apart sufficiently to allow the piece to drop through into the proper receptacle adapted to receive that size.

The details of my invention will be readily understood from the description of the accompanying drawings given below. In such drawings;

Figure 1 is a top view of the grading device with most of the auxiliary grading members removed.

Fig. 2 is a longitudinal vertical section of my improved fruit grader, taken on the line 2—2 of Fig. 1 showing the general arrangement of the auxiliary, transverse grading members.

Fig. 3 is a transverse section taken approximately on the line 3—3 of Figs. 1 and 2, and Fig. 4 is an enlarged longitudinal section shown in diagram form, and indicating the manner in which the rectangles formed by the primary and auxiliary grading members vary at different positions on the device.

In a patent application filed by me on October 23, 1914, Ser. No. 868,335, under title of fruit and vegetable grader, is fully described the means for grading fruit or vegetables with respect to one diameter, and which means are referred to in the present application as the primary grading members. I shall therefore refer briefly herein to the construction of said primary members.

Longitudinal frame members $a$, are connected by transverse brace members $b$, $b'$, $b^2$ and the frame thus formed is mounted on a table, the members of which are indicated by $c$. On opposite ends of the frame are journaled the rolls $d$ and $e$, the latter being positively driven by means of a motor $f$ and connections $f'$.

Longitudinal way members $g$ are pivoted at their rear ends on the transverse brace member $b$. The brace members $b'$ and $b^2$ longitudinal, vertical slots $h'$ and $h^2$ and bolts $i'$, $i^2$ in said ways extend through the slots and are clamped by wing nuts $j'$, and $j^2$.

This construction provides a means for adjusting the diverging angle of each pair of way members. The longitudinal way members form four diverging channels, each of which is used for a certain grade of fruit.

All of said way members are provided on one edge with a longitudinal groove $l$ which forms a guide way for the endless belt conveyers $t$, which carry the fruits to be graded. Said conveyers run over the rolls $d$ and $e$, which are driven constantly in the same direction. As previously explained in the aforesaid mentioned application, the fruits to be graded are placed on the endless conveyers and are carried longitudinally along the machine until the divergence of the respective carriers permits said objects to drop through the channel formed by the conveyers into suitable bins located beneath the frame, and which bins are not shown in these drawings.

The features which constitute my invention consist of the following parts: Adjustably mounted on the longitudinal frame members *a* are the ways *m*. Said ways may be adjusted vertically with respect to the frame members *a* by means of the clamping bolt *n* sliding in the slot *a'*. (See Fig. 3). Grooves *m'* are provided in the upper edge of the ways *m*, said grooves being adapted to serve as guide ways for the endless bands *o*. The endless bands *o* are connected by a series of rods *p* which form hinge pintles for the double-leafed partitions, the leaves of which are indicated by *r* and *s*. The lower edges of these leaves bear freely on the endless carriers *t*. The endless bands *o* pass over the rolls *d* and *e*, and are driven positively in unison with the endless carriers *t*. A pair of endless bands *u* encompass the series of rods *p*, said belts also passing over the rolls *d* and *e* and adapted to travel in unison with the partitions. The bands *u* perform the function of holding the partitions from spreading through an angle greater than one hundred and eighty degrees as they are carried back below the machine frame, and hold them in position for properly positioning themselves when they again begin their travel along on top of the machine. The objects to be graded such as apples are indicated by *v* in the broken lines of Figs. 1 and 2, are placed on the ways of the grading device at the left end of the machine, the grade of the apple determining which way it is to be placed upon. The apple will be supported in the rectangular holding space formed by a pair of the endless carriers *t*, and the adjacent leaves of the consecutive partitions. As the carriers and partitions are moved forward along the machine, the endless carriers *t* will diverge thereby increasing the width of the holding space. The inclined edges of the ways *m* will tend to elevate the belts *o* and therewith the hinge-rods *p*, thereby partially closing the leaves of the consecutive partitions and increasing the longitudinal dimension of the holding space.

This action is indicated in diagram form in the broken lines of Fig. 4. The varying of the longitudinal dimension is proportional to the varying of the lateral dimension. It will thus be seen that the apple will not drop through the holding space previously described unless the two diameters have the proper proportion relative to each other.

It is to be noted that all parts of the machine travel in unison, and as a consequence no friction is developed by unequal speeds of different parts.

The construction of my grader is, of course, not restricted to the exact details given above. The mechanism described is merely that which I have found convenient in practice.

I claim:

1. In a grader of the character described, the combination of a pair of primary grading members traveling longitudinally, being spaced apart and diverging in the direction of travel, auxiliary grading members arranged transversely to said primary members overlying the grading surfaces of the latter and traveling in unison therewith, and means for causing said auxiliary grading members to be progressively spaced apart in unison with the progressive divergence of said primary grading members.

2. In a grader of the character described, the combination of a pair of belts traveling side by side spaced apart and diverging in the direction of their travel; supporting and guiding means for said belts; transverse, parallel, movable bars overlying the belts and arranged to form a transverse channel thereon; and means for spacing said bars apart relatively to the progressive divergence of said belts.

3. In a grader of the character described, the combination of a pair of flat belts traveling side by side spaced apart and diverging in the direction of their travel; ways for said belts to run on having their upper faces channeled; guide elements on the under faces of said belts running in said channels; transverse, parallel, movable bars overlying the belts and arranged to form a transverse channel thereon; and means for spacing said bars apart relatively to the progressive divergence of said belts.

4. In a grader of the character described, the combination of a pair of primary grading members traveling side by side spaced apart and diverging in the direction of travel, companion partition members overlying the grading surfaces of said primary grading members, being arranged transversely thereto and traveling in unison therewith and being inclined toward each other, and means for spacing said partition members relatively to the progressive divergence of said primary grading members.

5. In a grader of the character described, the combination of a pair of primary grading members traveling side by side, being spaced apart and diverging in the direction of travel, a plurality of two-leaf partitions overlying the primary grading members, being arranged transversely thereto and traveling in unison therewith, said leaves being hinged together and the companion leaves of adjacent partitions being inclined toward each other, and means for varying the inclination of said companion leaves relatively to the progressive divergence of said primary grading members.

6. In a grader of the character described, the combination of a pair of carriers traveling side by side, being spaced apart and diverging in the direction of travel, a plurality of two-leaf partitions overlying the carriers, being arranged transversely thereof and traveling in unison therewith, said leaves being hinged together and the complementary leaves of adjacent partitions being inclined toward each other, said leaves resting on said carriers, and means for moving the hinge axis of the leaves of said partitions farther from said carriers in unison with the progressive divergence of the latter.

7. In a grader of the character described, the combination of a pair of belt-like carriers traveling side by side, being spaced apart and diverging in the direction of travel, a plurality of two-leaf partitions overlying the carriers, being arranged transversely thereof and traveling in unison therewith, said leaves being hinged together and the complementary leaves of adjacent partitions being inclined toward each other, said leaves resting on said carriers, and means for moving the hinge axis of the leaves of said partitions farther from said carriers in unison with the progressive divergence of the latter.

8. A grader of the character described comprising a frame, a transverse roller journaled at each end of the frame, carriers running side by side spaced apart over said rollers and diverging in the direction of their travel, bands traveling parallel to said endless carriers and also over said rollers, ways supporting said bands above said carriers, a plurality of two-leaf partitions hinged pendent from said bands transversely to said carriers, the lower ends of said leaves diverging from their hinge center and resting on said carriers, said ways being inclined so as to elevate the hinge axis of said partition-leaves in unison with the progressive divergence of said carriers, and means for driving one of said transverse rollers.

9. A grader of the character described comprising a frame, a transverse roller journaled at each end of the frame, belt-like carriers running side by side spaced apart over said rollers and diverging in the direction of their travel, bands traveling parallel to said endless carriers and also over said rollers, ways supporting said bands above said carriers, a plurality of two-leaf partitions hinged pendent from said bands transversely to said carriers, the lower ends of said leaves diverging from their hinge center and resting on said carriers, said ways being inclined so as to elevate the hinge axis of said partition-leaves in unison with the progressive divergence of said carriers, and means for driving one of said transverse rollers.

10. A grader of the character described comprising a frame, a transverse roller journaled at each end of the frame, belt-like carriers running side by side spaced apart over said rollers and diverging in the direction of their travel, bands traveling parallel to said endless carriers and also over said rollers, vertically adjustable ways supporting said bands above said carriers, a plurality of two-leaf partitions hinged pendent from said bands transversely to said carriers, the lower ends of said leaves diverging from their hinge center and resting on said carriers, said ways being inclined so as to elevate the hinge axis of said partition-leaves in unison with the progressive divergence of said carriers, and means for driving one of said transverse rollers.

WALTER GRANT PALMER.

Copies of this patent may be obtained for five cents each, by addressing the "Commissioner of Patents, Washington, D. C."